United States Patent
Trainer et al.

(10) Patent No.: US 12,387,313 B2
(45) Date of Patent: Aug. 12, 2025

(54) ARTIFICIAL INTELLIGENCE DRIVEN AUTOMATED ATOMIC MANIPULATION

(71) Applicant: UCHICAGO ARGONNE, LLC, Chicago, IL (US)

(72) Inventors: Daniel Joseph Trainer, Brookfield, IL (US); Srilok Srinivasan, Woodridge, IL (US); Nathan P. Guisinger, Woodridge, IL (US); Saw Wai Hla, Willowbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 519 days.

(21) Appl. No.: 17/733,812

(22) Filed: Apr. 29, 2022

(65) Prior Publication Data
US 2023/0351579 A1   Nov. 2, 2023

(51) Int. Cl.
*G06T 7/00* (2017.01)
*G06T 7/70* (2017.01)

(52) U.S. Cl.
CPC ............... *G06T 7/001* (2013.01); *G06T 7/70* (2017.01); *G06T 2207/10061* (2013.01); *G06T 2207/20081* (2013.01); *G06T 2207/30108* (2013.01)

(58) Field of Classification Search
CPC . G06T 7/001; G06T 7/70; G06T 2207/10061; G06T 2207/20081; G06T 2207/30108
See application file for complete search history.

(56) References Cited

U.S. PATENT DOCUMENTS

| 2009/0116696 A1* | 5/2009 | McKernan | G06T 7/0004 |
| | | | 382/108 |
| 2017/0254996 A1* | 9/2017 | Lee | G02B 21/361 |
| 2022/0130033 A1* | 4/2022 | Rashidi | G06T 7/0008 |

FOREIGN PATENT DOCUMENTS

WO   WO-2020/163967 A1   8/2020

OTHER PUBLICATIONS

Crommie et al., Confinement of electrons to quantum corrals on a metal surface, Science, 262: 218-220 (1993).
Eigler et al., Positioning single atoms with a scanning tunneling microscope, Nature, 344:524-7 (1990).
Heinrich et al., Molecule cascades, Science, 298(5597): 1381-7 (Nov. 2002).

(Continued)

*Primary Examiner* — Utpal D Shah
(74) *Attorney, Agent, or Firm* — MARSHALL, GERSTEIN & BORUN LLP

(57) ABSTRACT

Typical atomic manipulation techniques require long fabrication times and are not readily scalable due to necessary input from an operator. A method and system for performing automated atomic manipulation is described. The method includes obtaining an image of an atomic manipulation surface for fabricating an atomic structure thereon. A processor performs image processing and determines a movable elements, and defects, in the image of the atomic manipulation surface. The processor further determines respective positions of each of the movable elements, and forbidden regions of the atomic manipulation surface, each forbidden region determined from the determined defects. A fabrication design plan is then determined from the positions of the movable elements, and forbidden regions.

16 Claims, 7 Drawing Sheets

(56) References Cited

OTHER PUBLICATIONS

Hla et al., Inducing all steps of a chemical reaction with the scanning tunneling microscope tip: Towards single molecule engineering, Phys. Rev. Lett., 85:2777-80 (2000).
Hla et al., Single-atom manipulation mechanisms during a quantum corral construction, Phys. Rev. B, 67:201402(R) (2003).
Hla, Atom-by-atom assembly, Rep. Prog. Phys., 77:056502 (2014).
Kalff et al., A kilobyte rewritable atomic memory, Nature Nanotechnology, 11:926-30 (2016).
Kawai et al., Superlubricity of graphene nanoribbons on gold surfaces. Science 351, 957-961 (2016).
Khajetoorians et al., Realizing all-spin-based logic operations atom by atom, Science, 332(6033): 1062-4 (May 2011).
Krull et al., Artificial-intelligence-driven scanning probe microscopy, Comm. Physics, 3, article No. 54 (2020).
Manoharan et al., Quantum mirages formed by coherent projection of electronic structure, Nature, 403:512-515 (2000).
Rashidi et al., Autonomous Scanning Probe Microscopy in Situ Tip Conditioning through Machine Learning, ACS Nano, 12(6):5185-9 (Jun. 2018).
Skeini et al., Automated atomicscale construction, IEEE Nano 2006 Proceedings, pp. 610-612 (2006).
Trainer et al., Manipulating topology in tailored artificial graphene nanoribbons. arXiv: 2104.11334 (2021).
Zhang et al., One-dimensional lateral force anisotropy at the atomic scale in sliding single molecules on a surface, Nano Lett., 21(15):6391-7 (2021).

\* cited by examiner

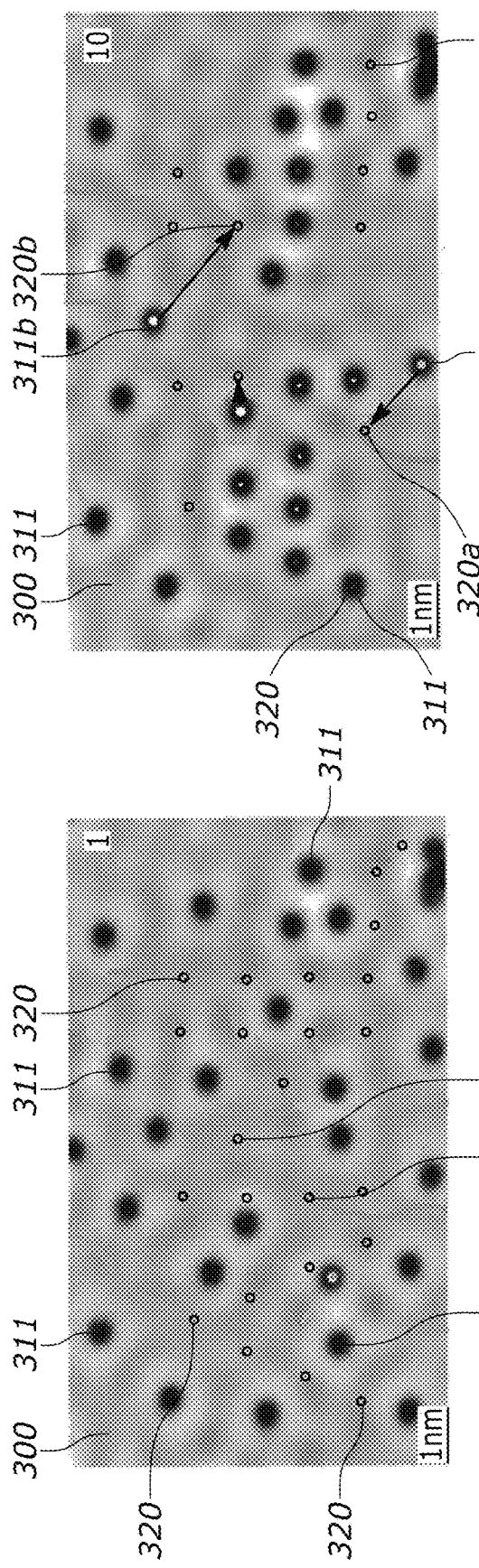
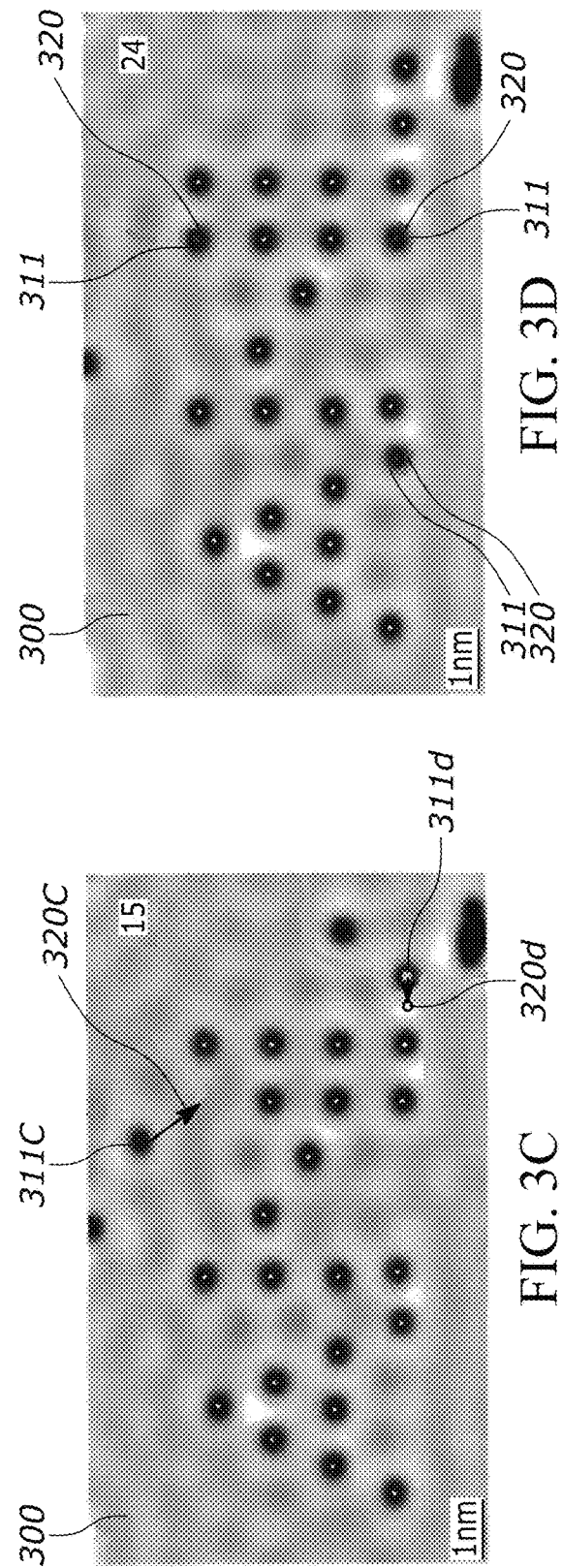
FIG. 3A
FIG. 3B
FIG. 3C
FIG. 3D

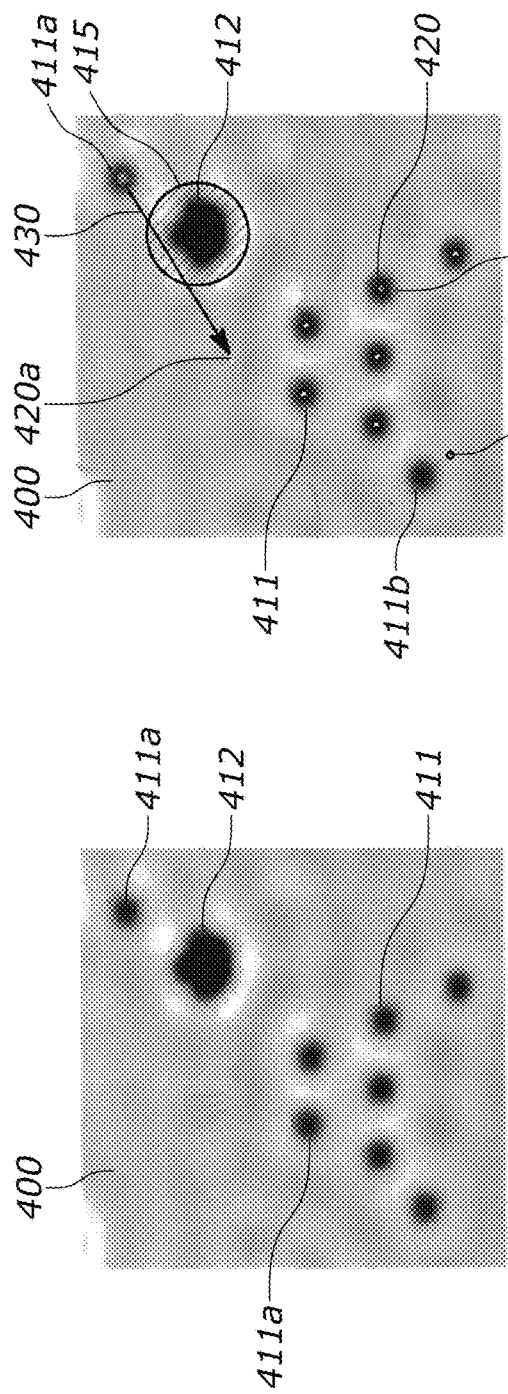
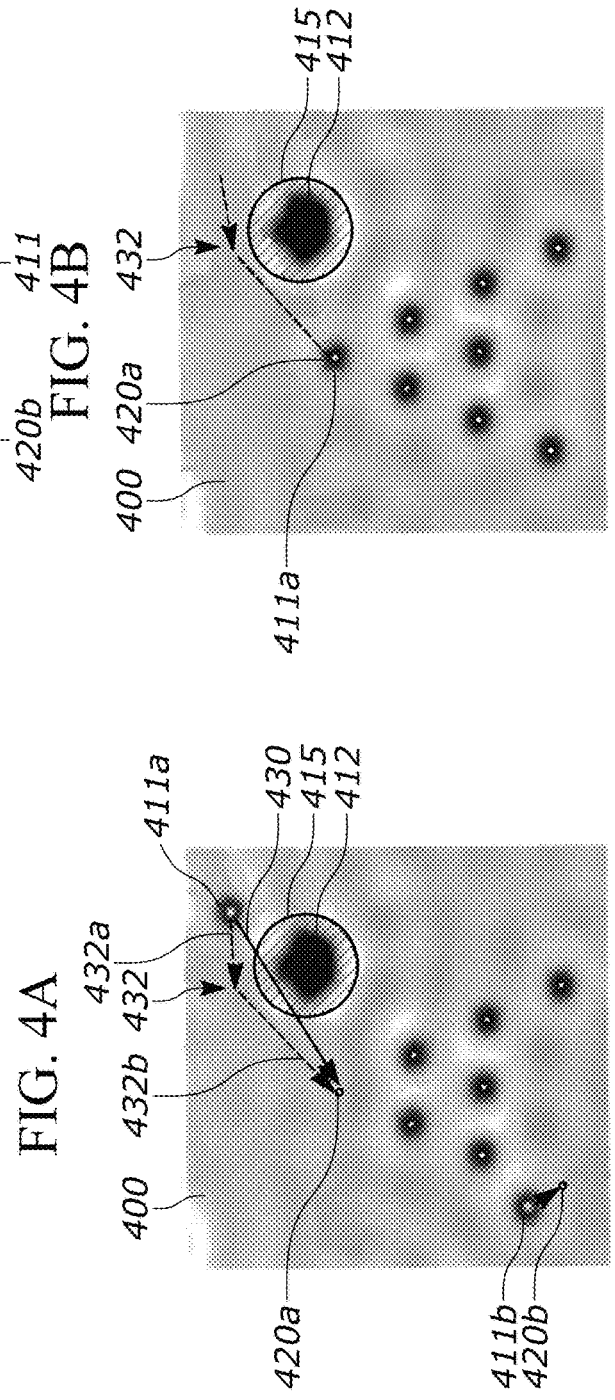
FIG. 4A
FIG. 4B
FIG. 4C
FIG. 4D

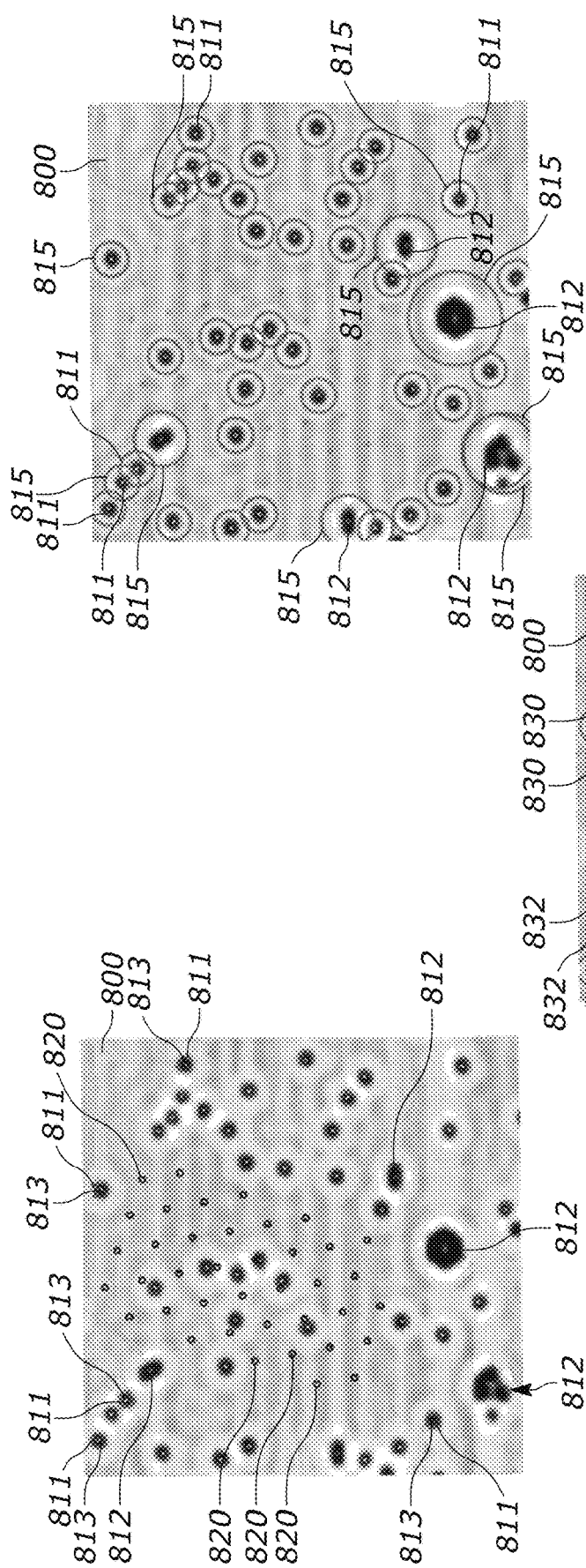
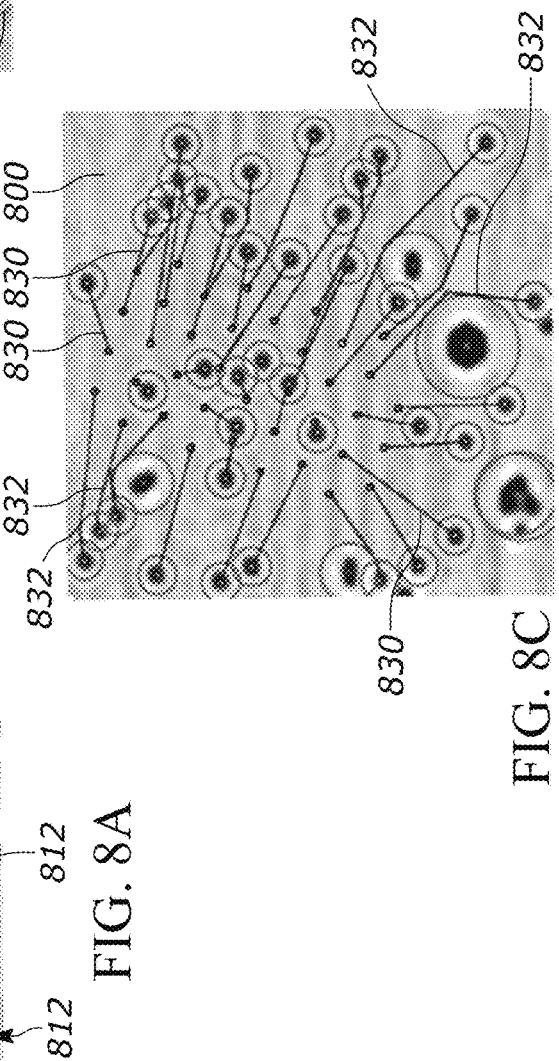
FIG. 8A
FIG. 8B
FIG. 8C

ARTIFICIAL INTELLIGENCE DRIVEN AUTOMATED ATOMIC MANIPULATION

STATEMENT REGARDING FEDERALLY SPONSORED RESEARCH OR DEVELOPMENT

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE DISCLOSURE

The present disclosure relates to methods and systems for atomic scale fabrication, and specifically to machine learning and automated systems for performing atomic scale fabrication.

BACKGROUND

Nanoscale devices, and sub-nanometer scale devices, require precise control of surfaces for fabricating structures that are implemented in electronics, medical devices, communications technologies, and an array of other fields and industries. Control of the positions of single atoms may be required to fabricate devices having certain structural, electronic, magnetic, or quantum properties or characteristics. Additionally, atomic manipulation may be used to fabricate precise molecules, or to investigate phenomena at the sub-atomic scale such as atomic scale friction and superlubricity.

Scanning probe microscopes (SPMs) allow for the control of positions of single atoms and molecules on surfaces with sub-atomic precision. An SPM may be used to create arbitrary artificial designs on the atomic scale. Typically, operation of an SPM requires extensive training for an operator, and performing the atomic manipulation is extremely time consuming and requires constant input from the operator. The operator must observe a surface and identify movable atoms, and then the operator must individually move each atom into a desired structural arrangement. SPM probe tips are easily damaged if brought too close to a surface or to a defect of a surface. For example, an SPM tip may be damaged if an attempt to move a defect or group of atoms occurs, or if the SPM tip is moved across a defect that protrudes from a surface. Different geometries of the SPM tip may be more or less easily damaged by different sizes, and different distances from defects. Typically, SPM tips are damaged if the tip comes within a distance of 20 nanometers, or less than 10 nanometers of a defect. Therefore, during operation, structures as small as a nanometer to a few nanometers may be large enough to damage the tip. Once damaged, an SPM tip must be fixed, and recalibrated further requiring more time and financial cost for fabricating atomic scale structures.

While atomic scale manipulation is useful for fabricating nanoscale, and sub-nanoscale, devices, for a wide range of industries, the time and financial costs of performing this type of atomic manipulation prevent the widespread adoption of such methods and technologies. Further, existing methods and systems for performing atomic manipulation are not readily scalable for any sort of high throughput production process, or mass production, since currently, a single operator uses a single SPM to fabricate one structure at a time.

SUMMARY OF THE DISCLOSURE

In an embodiment, disclosed is a method for performing automated atomic manipulation to fabricate nanoscale structures. The method includes an imaging sensor obtaining an image of an atomic manipulation surface. The imaging sensor may include a scanning tunneling microscope that performs a scan of the surface to obtain the image. A processor determines a plurality of candidate features in the obtained image, the candidate features indicative of a movable atom on the surface, movable molecule on the surface, or defect on, or of, the surface. The processor then identifies movable atoms and moveable molecules from the candidate features, and further identifies respective positions of each of the movable atoms on the surface. The processor identifies the defects from the candidate features, and further identifies one or more forbidden regions, wherein each forbidden region contains at least one of the identified defects. The forbidden regions are regions of the surface that are not to be traversed by a probe tip of a scanning probe.

In a variation of the current embodiment, the method includes identifying additional forbidden regions, with each additional forbidden region containing at least one of the moveable atoms and/or moveable molecules. To identify movable atoms, movable molecules, and defects, the processor may implement a machine learning and/or artificial intelligence technique. The processor may determine a design plan for automatically fabricating a nanostructure. For example, the processor may determine movement paths for the moveable atoms and/or movable molecules, with each movement path not traversing any forbidden regions of the surface. The processor may perform a global path minimization technique to optimize the design plan and the movement paths of the design plan.

In another embodiment, disclosed is a method of training a system for performing automated atomic scale manipulation for fabricating atomic scale structures. The method includes retrieving, by a processor and from a memory, a plurality of scanning microscopy images. Each of the scanning microscopy images includes a classification parameter identifying each image as including either (i) a movable atom, (ii) a defect, or (iii) an empty region. The processor performs image processing on the images and determines, through the image processing, characteristic properties of the images. The method then includes identifying, by the processor and from the characteristic properties of the images, identification properties for each classification parameter. The identification properties are indicative of images belonging to each respective classification parameter. The identification properties may include an image sharpness, a contrast value, an edge detection value, image pixel brightness, or another image property that is indicative of whether the image contains a movable atom, movable molecule, or defect.

In yet another embodiment, disclosed is a system for performing automated atomic scale manipulation. The system includes a scanning microscope having a scanning probe that provides electrostatic manipulation of positions of atoms on a surface. The system further includes a processor configured to execute machine readable instructions, and a non-transitory computer-readable memory having machine readable instructions stored thereon. When executed by the processor, the machine-readable instructions cause the system to obtain, by the scanning microscope, a surface image of a surface having defects and movable nanostructures. The machine readable instructions further cause the system to identify, by the processor, a plurality of movable nanostructures and positions of each movable nanostructure on the surface, and identify a plurality of defects and a position of each defect on the surface. The instructions then cause the system to identify, by the processor and from the plurality of defects, a plurality of forbidden regions, each forbidden region containing an identified defect, and wherein each forbidden region is indicative of a region of the surface that is not to be traversed by the scanning probe of the scanning microscope. To identify the plurality of movable structures, and the defects, the processor may implement a machine learning technique, or an artificial intelligence technique.

BRIEF DESCRIPTION OF THE DRAWINGS

FIG. 3A is an image of a surface with a plurality of movable nanostructures disposed at various initial positions on the surface.

FIG. 3B illustrates a surface and a nanostructure design after a portion of movable nanostructure have been manipulated into desired design positions on the surface.

FIG. 3C is an image of a nanostructure on a surface and after 15 iterations of a nanostructure fabrication design cycle.

FIG. 3D is an image of a finalized nanostructure on a surface.

FIG. 4A is a scanning tunneling microscopy image of a surface having moveable nanostructures and a defect.

FIG. 4B is a scanning tunneling microscopy image illustrating a forbidden region around a defect.

FIG. 4C is a scanning tunneling microscopy image illustrating a multi-vector movement path for a moveable nanoelement.

FIG. 4D is a scanning tunneling microscopy image of a fabricated nanostructure on a surface.

FIG. 8A is a scanning tunneling microscopy image of a surface with a plurality of defects and moveable nanoelements in the form of carbon-monoxide (CO) molecules at initial positions on the surface.

FIG. 8B is a scanning tunneling microscopy image of forbidden regions of the surface of FIG. 8A.

FIG. 8C is a scanning tunneling microscopy image showing the determined movement paths for performing a design fabrication cycle on the surface of FIG. 8A.

DETAILED DESCRIPTION

Figure 1:
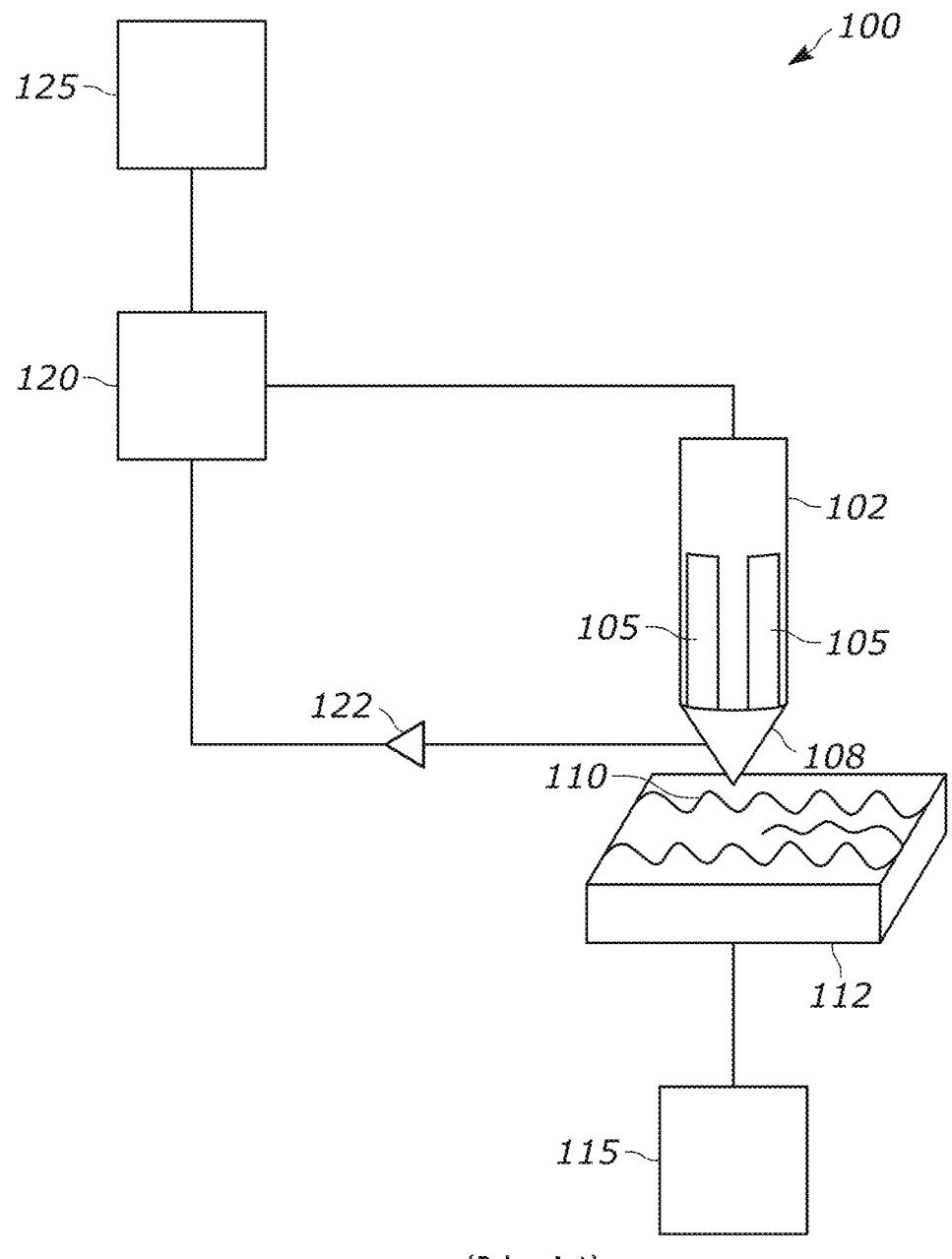
FIG. 1 is a diagram illustrating the functionality of a scanning tunneling microscopy system.

Atomic scale manipulation and fabrication is useful across a variety of fields from quantum communication and quantum computing, to environmental applications and fabrication of semiconductor devices and room-temperature superconductors. The ability to precisely position physical elements, such as atoms and molecules, with atomic scale accuracy allows for fabrication of structures and devices unable to be built using other techniques. One method of performing atomic scale manipulation employs a scanning probe having a scanning probe tip as the element that moves the atoms or molecules on a surface. Atomic manipulation using a scanning probe tip can be used to synthesize individual molecules or to build quantum corrals with varying shapes and sizes. Furthermore, atomic-scale manipulation techniques can be used to investigate nano-scale and atomic-scale phenomena and features, such as atomic scale friction, superlubricity, Dirac fermions, and topologically protected quantum states in artificial lattices.

Current methods for performing atomic-scale manipulation have major drawbacks as the fabrication is incredibly time consuming and requires constant and vigilant operator input. To move an atom/molecule, the operator needs to scan the surface to generate an image of the surface and visually analyze the resulting topographical image to identify which atoms/molecules are to be moved and are capable of being moved. The operator then has to control the probe tip to perform the physical manipulation of the atoms/molecules. Once one atom/molecule has been positioned for the atomic fabrication, the operator must rescan the surface to generate an updated image of the surface and the new position of the atom/molecule. The operator must then confirm the new location of the atom/molecule as a correct location before moving on to manipulate a next atom/molecule for fabricating the desired nanoscale structure. As such, typical techniques are time consuming, tedious, and require operator expertise. It is often necessary to perform multiple manipulations of a single atom or molecule before the correct position has been achieved.

Surfaces often have multiple defects that must be physically avoided when performing the atomic manipulation. For example, a bundle of molecules on the surface must be avoided by the probe, otherwise the probe is likely to be damaged and must be reshaped before performing any sort of imaging or atomic manipulation. Further, defects may appear as movable atoms or molecules which, when attempted to be moved, also damage the probe causing recalibration of the probe. For more advanced structures and application, it is necessary to move thousands of atoms or molecules, if not more, requiring a prohibitive amount of time. To overcome this hurdle, attempts have been made to automate the atomic manipulation process. Existing attempts at automation, still require user input for determining movable atoms/molecules and defects, which is not only time consuming but also restricts fabrication only to region of the surface already analyzed by the operator. In practice, it is often necessary to move to different regions of a surface, making the current automated subroutines obsolete. The scale at which atomic manipulation is performed is often much smaller than the eventual scale of a corresponding finished fabricated atomic structure. Therefore, a typical atomic manipulation process cycles between manipulating molecules and atoms into desired positions, and moving across a surface to scan and find more molecules to move into other desired positions within the lattice of the surface. With more advanced structures that require any substantial number of molecules, it is also necessary to move to other areas to grab molecules to bring them into the region of interest. For example, structures requiring even as little as 10 molecules may require the scanning system to scan other regions of a surface to find molecules to manipulate to fabricate a nanostructure. The time consuming and error prone nature of current atomic-scale manipulation techniques prevent scaling and mass production of atomic scale fabrication.

This disclosed method and system utilize machine learning and artificial intelligence (AI) techniques for performing automated atomic-scale manipulation. The described technologies use a scanning tunneling microscope (STM), and associated systems, for performing automated classification of atomic-scale features using STM topography. While the methods are described using an STM system, other systems may be used to perform the described methods. For example atomic force microscopy, or another type of scanning probe microscopy may be used. Leveraging machine learning and AI techniques, the disclosed method allows for the automated fabrication of arbitrary atomic scale structures without the need for operator control of the device during classification of movable atoms/molecules, and defects, or for performing the actual movement and manipulation of the atoms/molecules themselves. By using artificial intelligence and automation in place of a human operator to classify atomic scale features in STM topographies, the system can analyze surfaces that an operator has not explicitly classified, paving the way for mass produced atomic scale processing with overall shorter fabrication times.

FIG. 1 is a diagram illustrating the functionality of a scanning tunneling microscopy system 100. The STM system 100 includes a piezoelectric tube 102 that has electrodes 105 disposed thereon to provide electric fields to the piezoelectric tube 102. A probe 108, also referred to herein as a tip, protrudes from the piezoelectric tube 102 toward a surface 110 of a substrate 112. A controller 120 provides voltages to the electrodes 105 to control a position and angular orientation of the tip 108. A tunneling voltage source 115 is electrically coupled to the substrate 112 to provide a voltage to the substrate 112. The tip 108 is brought sufficiently close to the surface 110 to satisfy conditions for quantum tunneling of electrons to occur. Once quantum tunneling is established, electrons tunnel from the surface 110 of the substrate 112 to the tip 108 providing an electrical current to the tip 108. The tip 108 then provides the electric current to a tunneling current amplifier 122. The tunneling current amplifier 122 amplifies the current received from the tip 108 and provides the amplified current to the controller 120. The controller 120 then may determine a distance of the tip to the surface 110. One or more actuators or motors (not shown) may then scan the position of the tip 108 across the surface 110 and the controller 120 may determine distances from the tip 108 to the surface 110. Further, motors and actuators may move the tip 108 closer to, or further away from, the surface 110 to protect the tip 108 from being damaged and to perform a topographical measurement of the surface 108. The controller 120 may provide data indicative of the topography of the surface 110 to a display 125. The display 125 may then display an image, or topographical map, of the surface 110 to a user.

Figure 2A:
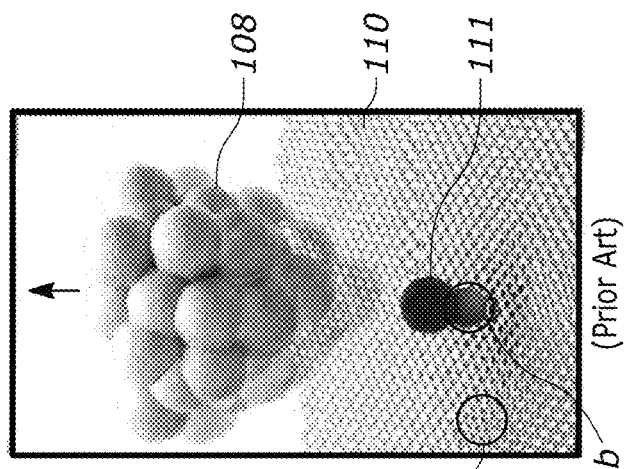
FIG. 2A is a diagram illustrating lateral nanoscale manipulation of a molecule with the molecule at an initial position on a surface.
Figure 2B:
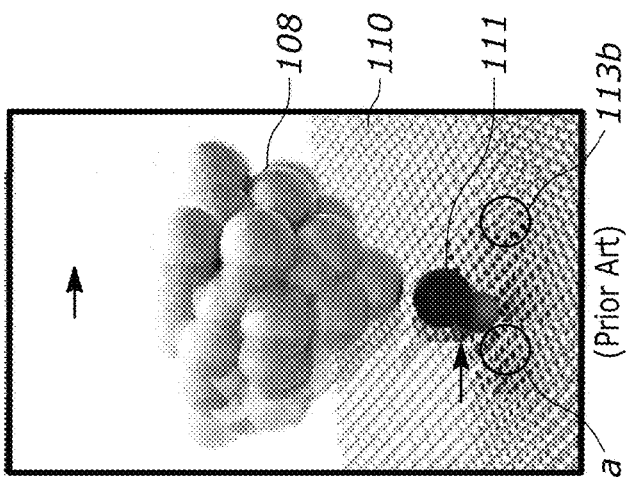
FIG. 2B is a diagram illustrating lateral nanoscale manipulation of a molecule with the molecule being translated across a surface.
Figure 2C:
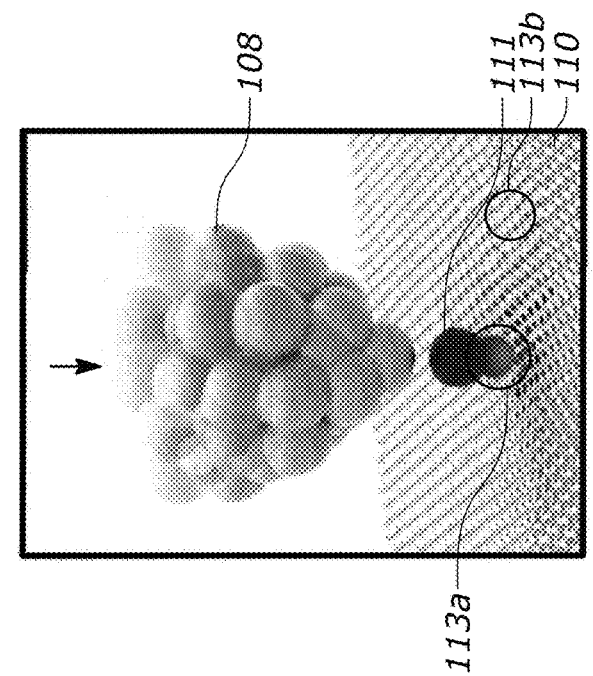
FIG. 2C is a diagram illustrating lateral nanoscale manipulation of an atom with the atom at a final position on a surface.

STM systems can also be used to manipulate movable atoms/molecules along a surface to fabricated nanoscale structures. FIGS. 2A-2C illustrate performing nanoscale manipulation using lateral manipulation of a molecule. Lateral atomic manipulation is performed by establishing a temporary chemical or physical bond between an STM probe tip and a moveable atom/molecule. An STM probe tip 108 is brought close to a surface 110 with the surface 110 having a molecule 111 thereon. The probe tip 108 moves the molecule 111 from a first position 113a to a second position 113b on the surface 110. The tip 108 of the probe is positioned proximal to the molecule 111 to induce a tunneling current between the probe 108 and the surface 110. The distance between the probe tip 108 and the molecule 111 is smaller than the typical distance required for performing an STM scan of the surface 110. Due to the decreased distance between the probe tip 108 and the molecule 111, a temporary physical bond in the form of an electrostatic bond is established between the probe tip 108 and the molecule 111. The probe tip 108 is then moved laterally across the surface 110 and the molecule 111 is dragged by the bond with the probe tip 108. In the example of FIGS. 2A-2C, the molecule originally rests at a bonding site at the first position 113a, and is dragged by the probe tip 108 to a bonding site at the second position 113b. Once the probe tip 108 has moved to the second position 113b, the probe tip 108 is retracted away from the surface 111 to break the electrical bond between the probe tip 108 and the molecule 111. The molecule 111 has then been manipulated and moved into the new second position. While described as being dragged from one position to another, an atom or molecule may be pushed, pulled, or slid along with the probe tip 108 depending on the force provided by the electrical bond, and by the shape of the tip 108 of the probe. Additionally, the tunneling current can be monitored to determine how many bonding sites, or the total distance, that the molecule 111 has been moved laterally.

While described in FIGS. 2A-2C as lateral manipulation, a person of ordinary skill in the art would recognize that the described methods and technologies may also be performed using vertical nanoscale manipulation. Vertical nanoscale manipulation involves transferring an atom or molecule from the surface 110 to the probe tip 108, moving the probe to a new position above the surface 110, and then depositing the atom or molecule at a new position on the surface 110. Use of either lateral or vertical nanoscale manipulation may depend on the materials of the surface, a roughness of the surface, a number of defects on the surface, specific materials atoms or molecules to be moved, a shape of the probe tip 108, and/or the strength of the electrical bond between the probe tip 108 and the atom or molecule.

FIGS. 3A-3D are STM images of a surface 300 having nanoscale structure fabrication being performed thereon. FIG. 3A is an image showing the surface 300 with a plurality of movable nanostructures 311 disposed at various initial positions on the surface 300. FIG. 3A also includes final design positions 320 that are desired positions for the movable nanostructures 322 to be moved to for fabricating a nanostructure forming the letters "ANL". FIG. 3B illustrates the surface 300 and associated ANL nanostructure after a portion of the movable nanostructure 311 have been manipulated and repositioned to a portion of the final design positions 320. FIG. 3B is after 10 iterations of moving nanostructures was performed. It should be noted that a single iteration of moving nanostructures, according to the methods described further herein, may include moving multiple nanostructures during one iteration. For example, as illustrated in FIG. 3B, nanostructures 311a and 311b are to be moved according to respective vectors shown in FIG. 3B in a single iteration of a fabrication design cycle of a design plan.

A design plan is a set of instructions for manipulating atoms and/or molecules on a surface for fabricating a desired nanostructure. A design plan may include one or more fabrication cycles with each fabrication cycle including instructions in the form of movement paths for moving one or more atoms or molecules to a desired final design position. For example, a design plan may have a first fabrication cycle that only moves a single atom or molecule to a desired position. An STM may then take a topographical image of the surface before performing another fabrication cycle of the design plan. The STM may then perform a second cycle of the design plan according to the new position of the moved atom or molecule. In implementation, a design plan may be executed as a plurality of fabrication cycles with one or more atoms or molecules being manipulated in each fabrication cycle.

FIG. 3C is an image of the surface 300 after 15 iterations of a fabrication design cycle. Further illustrated is a position vector showing the next iteration of manipulations of nanostructures 311c and 311d. The nanostructure 311d had been previously manipulated to a position near the desired design position of 320d. After re-examination and analysis by the STM system, the system determined that the nanostructure 311d was not positioned at the desired design position 320d. Therefore, in the next iteration of the fabrication design cycle the STM system will adjust the position of the nanostructure 311d. FIG. 3D is an image of the surface 300 after all of the nanostructures 311 have been moved to the desired design positions 320 according to the design of the ANL nanostructure design.

FIGS. 4A-4D are STM images of a surface 400 having both moveable nanostructures 411 disposed thereon, and a defect 412 of the surface 400. The moveable nanostructures 411 may include one or more atoms or molecules, and the defect 412 may be a plurality of atoms or molecules in a clump, a divot in the surface, or a region having a concentration of electric charge. The defect 412 may be formed of multiple molecules or atoms that have aggregated around a crystallographic defect or atom. While illustrated in FIGS. 3A-3D as using single vector paths for moving movable nanostructures from a first position to a second desired design position, a design cycle may implement a multi-vector movement path for moving nanostructures to desired design positions.

FIG. 4A illustrates an example of a multi-vector movement path for moving a moveable nanostructure 411A from a first position to a second desired design position 420A for avoiding the defect 412. FIG. 4A shows the moveable nanostructure 411a on one side of the defect 412 with a corresponding desired design position 420a on an opposite side of the defect 412. FIG. 4B further shows a forbidden region 415 of the image that surrounds and contains the defect 412. The forbidden region 415 is a region of the surface 400 that is not to be traversed by an STM probe for performing nanoscale manipulation, such as lateral nanoscale manipulation as described in FIGS. 2A-2C. In examples, the forbidden region 415 may be a region of the surface that is a spatial extension of edges of the defect 412, with a border of the forbidden region 415 being several angstroms away from edges of the defect 412. For example, the border of the forbidden region 415 may be between one and five angstroms, between four and 10 angstroms, less than five angstroms, less than 10 angstroms, or less than 20 angstroms from the edges of the defect 412. The border of the forbidden region 415 may be circular, rectangular, square, elliptical, or any closed geometric shape to indicate the forbidden region 415. Further, open geometric shapes may be used as borders of the forbidden region 415, to indicate a border not to be crossed by an STM probe tip.

FIG. 4B further illustrates a shortest path movement vector 430 to move the moveable nanostructure 411a from its current position to the desired design position 420a. The shortest path movement vector 430 passes through the forbidden region 415, and therefore, cannot be used for performing atomic manipulation according to a fabrication design cycle. Therefore, multiple vectors must be used to move the moveable nanostructure 411a from its first position to the desired design position 420. FIG. 4C shows a multi-vector movement path 432 that includes a first movement vector 432a and a second movement vector 432b. An STM probe may then move the moveable nanostructure 411a in a piecewise manner first by the first movement vector 432a to a side of the forbidden region 415, and then the STM probe may move the moveable nanostructure 432b along the second movement vector 432b to the desired design position 420a. FIG. 4D shows the moveable nanostructure 420a after being moved to the desired design position 420a. Additionally, the fabrication cycle performed between FIGS. 4C and 4D adjusts the position of moveable nanostructure 411b to desired design position 420b, according to adjustment procedures and methods described herein.

While illustrated as being a two-vector movement path, a movement path may include one vector, two vectors, three vectors, or more vectors for moving a moveable nanostructure from a first position to a second desired design position. Multi-vector movement paths may also be used to avoid other moveable nanostructures depending on the layout of nanostructures, and desired design positions, for fabricating a specific structure. Further, multi-vector movement paths may be determined by a processing for a given structure fabrication cycle according to an optimization of the design cycles, such as using a universal path minimization optimization for fabrication for a specific nanostructure design.

The only information required from the user is a text file outlining the desired final positions of the molecules for fabricating a nanostructure. After that the automated program will scan the STM image, the features of the image are fed to the machine learning model which classifies them as either useful molecules (or atoms) to move or defective obstacles to avoid. The classification is then fed to the manipulation subroutine which calculates an optimal path between the current location of the molecules (or atoms) and their desired positions, circumventing obstacles along the way. The determined movement paths together form a design plan for fabricating the nanostructure. A fabrication cycle of the design plan is then provided to the STM electronics and the manipulations are carried out after which the area is automatically re-scanned and the process continues until all of the molecules are moved to desired locations on the surface.

Figure 5:
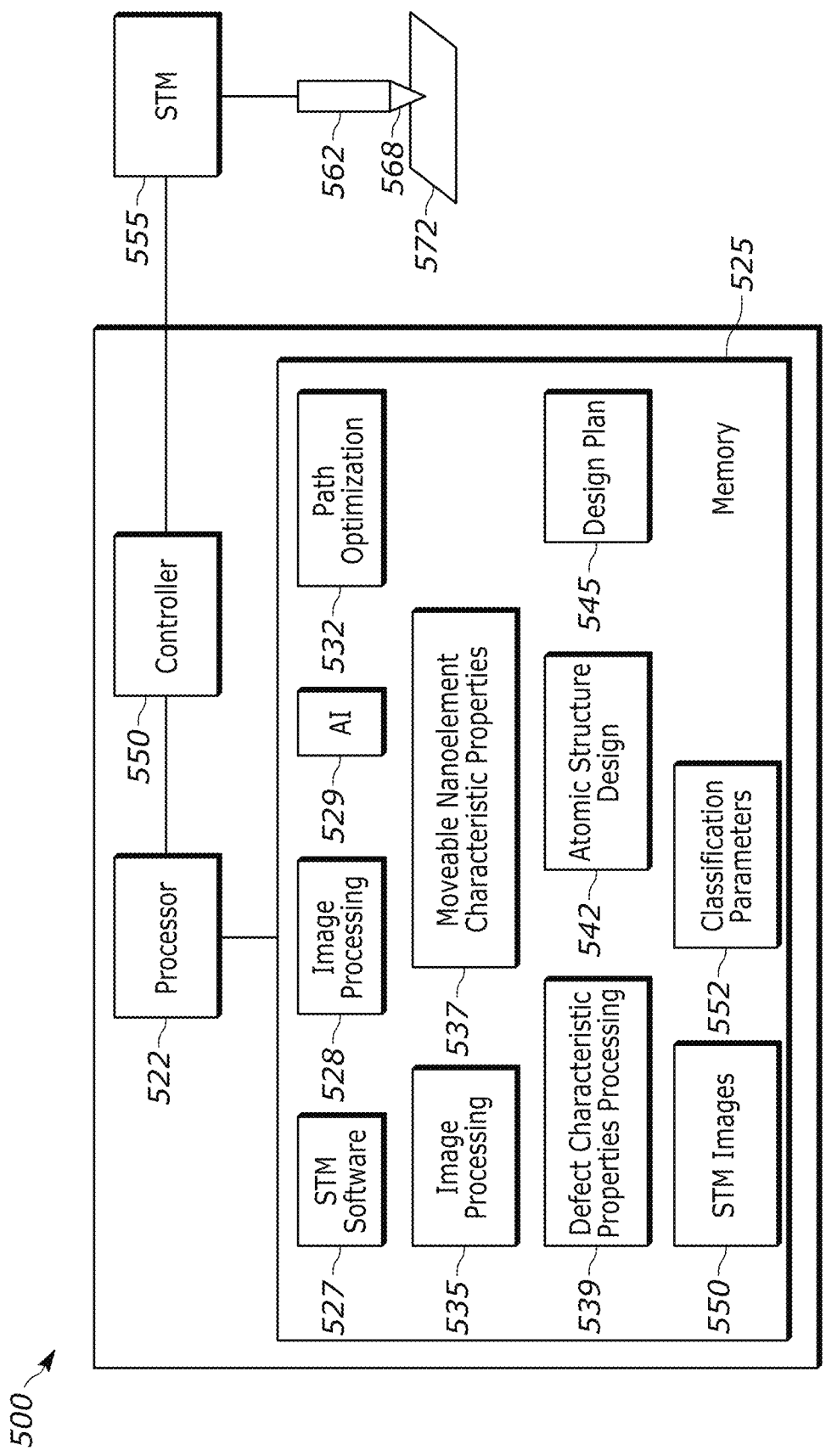
FIG. 5 is a block diagram of a setup for implementing automatic atomic manipulation.

FIG. 5 is a block diagram of a setup 500 for implementing the automatic atomic manipulation techniques as described herein. The setup 500 includes a scanning tunneling microscope 555 that has a probe 562 for performing topographical scans of surfaces, and for performing atomic manipulation, as previously described herein. The probe 562 has a tip 568 for manipulating atoms and/or molecules on a surface 572 for fabricating nanostructures on the surface 572. The system 500 further includes an automatic atomic manipulation system 520 having a processor 522, controller 550, and non-transitory computer-readable memory 525. The memory 525 stores STM software 527 that provides instructions for controlling the STM 555 and for processing signals received from the STM 555 to perform image processing and for generating images of surfaces scanned by the STM 555. While the STM software 527 may include certain signal and image processing algorithms, the memory 525 may store additional image processing 528 instructions for performing image analysis as described herein. Additionally, the memory 525 includes a path optimization algorithm 532 for optimizing movement paths of movable atoms and/or molecules as described herein for determining a design plan 545.

The memory 525 contains an artificial intelligence (AI) algorithm 529 which may include a machine learning technique or algorithm. The AI algorithm 529 may include an ensemble machine learning classifier such as RandomForest, and/or a gradient boosting classifier such as XGBoost. The AI algorithm 529 may include a plurality of machine learning and AI techniques that may selectively be applied based on sizes of data sets, or types of data sets (e.g., strings, alphanumerics, binary data, etc.). For example, the AI algorithm 529 may also include deep learning techniques that may be performed in addition to the previously mentioned machine learning techniques. Deep learning techniques may include a custom convolutional neural network technique. Any one of the mentioned machine learning or deep learning techniques may be used, or the AI algorithm may include other models for performing the methods described herein. The AI algorithm may be a trained AI model or technique. The machine learning model may be trained by a supervised machine learning technique. For example, the machine learning model may be trained by providing a series of images to the processor 522, and providing associated image classifications for each of the images. The processor 522 then determines image properties associated with each of the classifications. The processor 522 may then be provided with unclassified images and the processor may perform image processing on the unclassified images and further determine classifications of the unclassified images.

The system 500 further includes a processor 522 in communication with the memory 525. The processor 522 may retrieve machine readable instructions from the memory 525 to execute the machine readable instructions. Additionally, the processor 522 may retrieve data from the memory 525, and store data in the memory 525. The processor 522 is in further communication with a controller 550. The controller 550 controls the operation of the STM 555. For example, the controller 550 may control the STM 555 to perform a scan of the surface 572, and to perform an atomic scale manipulation of an atom or molecule disposed on the surface 572. The STM 555 may provide data indicative of a surface topography to the controller 550, and the controller 550 may further provide the data to the processor 522 for further processing. In examples, the processor 522 may be in direct communication with the STM 555 to retrieve topographical data directly from the STM 555. The processor 522 may provide instructions to the controller 550 according to a desired operation of the STM 555. For example, the processor 522 may provide a set of optimized movement paths to the controller 550 for fabricating a nanostructure on the surface 572. The controller 550 may then control the STM 555 to execute the optimized movement paths to perform a fabrication cycle for a nanostructure.

Figure 6:
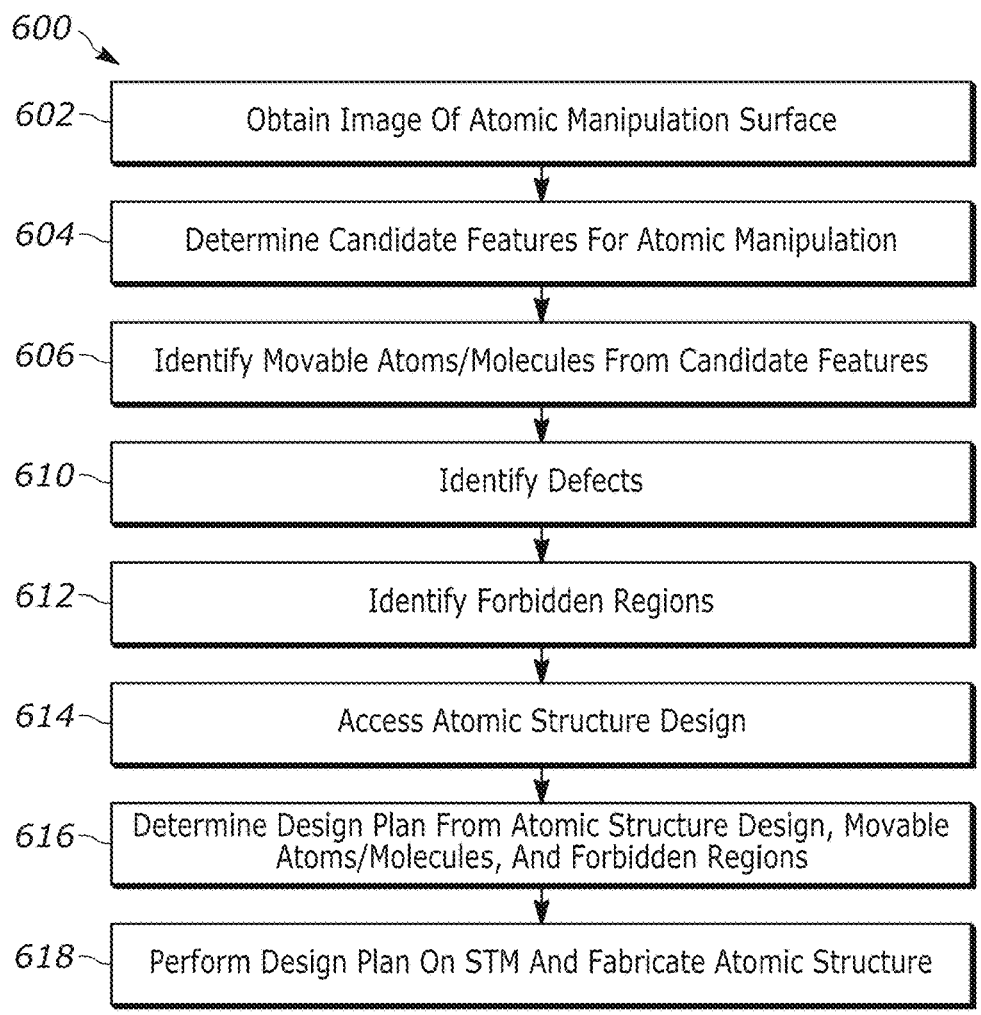
FIG. 6 is a flow diagram of a method of performing automated atomic manipulation.

FIG. 6 is a flow diagram of a method 600 of performing automated atomic manipulation. The method 600 of FIG. 6 may be implemented by the system 500 illustrated in FIG. 5. For clarity, the method 600 will be described with simultaneous reference to elements of FIG. 5. The method 600 includes obtaining an image of an atomic manipulation surface (block 602). The image may be a topographical image of the surface 572 obtained by the STM 555. To obtain the image, the processor 522 may access STM control processes (e.g., lower probe to surface, raise probe from surface, move probe laterally, apply voltage to probe tip, monitor tunneling current, etc.) from the STM software 527, and provide instructions to the controller 550. The controller 550 may control the STM 555 to perform a topographical scan of the surface 572. The atomic manipulation surface 572 is a surface having moveable nanoelements, such as atoms and/or molecules. The atoms and/or molecules can be manipulated for fabricating a nanoscale structure on the surface 572. Further, the surface 572 may have one or more defects including groups of atoms, groups of molecules, areas with high degrees of surface roughness, divots, or crystallographic defects such as vacancies, impurity substitutions, grain boundaries, or step edges.

The processor 522 then determines candidate features in the images, with the candidate features indicative of potential moveable nanoelements and/or potential defects (block 604). To determine the candidate features, the processor 522 may perform image processing 528 on the image, or on sub-regions of the image. For example, the processor 522 may perform an image contrast analysis and determine regions of the image that contain one or more candidate features. The processor 522 may then parse the image into independent images of the surface 572 for further analyzing. The processor 522 may implement a trained AI model or machine learning technique to determine the candidate features in the images, as described elsewhere herein in reference to identifying candidate features as moveable nanoelements or defects.

The processor 522 identifies movable nanoelements from the candidate features (block 606). Additionally, once the movable nanoelements have been identified, the processor 522 identifies positions or locations on the surface of each of the movable nanoelements. To identify the moveable nanoelements, the processor 522 may implement a machine learning technique, or an AI technique, such as an ensemble classifier, convolutional neural network, or other machine learning or deep learning technique. The machine learning technique may use a feature important map of pixels that is indicative of sizes and/or geometries of movable nanoelements for identifying the movable nanoelements. In examples, the processor 522 may further retrieve moveable nanoelement characteristic properties 537 stored in the memory 525, the moveable nanoelement characteristic properties 537 being values and properties 537 indicative images of surfaces having moveable nanoelements thereon. The moveable nanoelement characteristic properties 537 may include one or more image contrast values, image sharpness values, average pixel intensities, modulation transfer function value, or a candidate feature geometry. A candidate feature geometry may be determined by the processor 522 through performing image processing to determine a general shape of a potential moveable nanoelement. The processor 522 may perform edge detection on an image to determine boundaries of a candidate feature. To perform the edge detection, the processor 522 may perform a machine learning technique that identifies which pixels of an image are important for determining the shape of the candidate feature for further determining if the candidate feature is a moveable nanoelement. The machine learning model may generate a feature importance map that visually presents, to a user, which pixels of an image are most important for determining which candidate features are either moveable nanoelements or defects. The processor 522 may then identify movable nanoelements from the candidate features based on the geometry of the candidate feature in the image.

The moveable nanoelement characteristic properties 537 may include combinations of property values and ranges of property values. For example, an image having a moveable nanoelement may have characteristic properties of both a contrast value of greater than 100 (i.e., for contrast ranging from −255 to +255), and a modulation transfer function of greater than 50%. In such an example, an image may be determined to not include a moveable atom if an image does not have both of the described moveable nanoelement characteristic properties 537.

Once the moveable nanoelement characteristic properties 537 have been retrieved, the processor 522 further performs the image processing 528 on the obtained image to determine image properties of the obtained image. The processor 522 than compares the image properties of the obtained image with the moveable nanoelement characteristic properties 537 to determine if the obtained image includes a moveable nanoelement. The processor 522 may then determine, and store in the memory, data indicative of a position of the surface having, or lacking, a movable nanoelement.

The method 600 further includes, identifying, by the processor 522, defects from the candidate features (block 610). Additionally, once the defects have been identified, the processor 522 identifies positions or locations on the surface of each of the defects. To identify the defects, the processor 522 may implement a machine learning technique, or an AI technique, such as such as an ensemble classifier, convolutional neural network, or other machine learning or deep learning technique. The machine learning technique may use a feature important map of pixels that is indicative of sizes and/or geometries of movable nanoelements for identifying the movable nanoelements. In examples, the processor 522 may further retrieve defect characteristic properties 539 stored in the memory 525. The defect characteristic properties 539 being values and image properties indicative of images of surfaces having defects thereon. The defect characteristic properties 539 may include one or more image contrast values, image sharpness values, average pixel intensities, modulation transfer function value, or candidate feature geometry. As previously described, the processor 522 may determine the candidate feature geometry through image analysis and implementing a machine learning technique to identify defects from the candidate features. The defect characteristic properties 539 may include combinations of property values and ranges of property values. For example, an image having a defect may have characteristic properties of both a contrast value of greater than 100 (i.e., for contrast ranging from −255 to +255), and a modulation transfer function of less than 50%. In such an example, an image may be determined to include a defect if an image has both of the described defect characteristic properties.

Once the defect characteristic properties 539 have been retrieved, the processor 522 further performs image processing 528 on the obtained image to determine image properties of the obtained image. The processor 522 than compares the image properties of the obtained image with the characteristic properties to determine if the obtained image includes a defect. The processor 522 may then determine, and store in the memory, data indicative of a position on the surface having, or lacking, the defect.

The processor 522 then determines forbidden regions of the surface 572 (block 612). The forbidden regions are regions of the surface 572 having one or more defects. The forbidden region is indicative of a region of the surface that is not to be traversed by the tip 568 of the probe 562 of the STM 555. The size and geometric shape of the forbidden regions may depend on the size and shape of an associated defect contained within each forbidden region. In implementation, the forbidden regions are regions that are larger than an associated defect, to prevent the tip 568 of the probe 562 from coming close enough to the defect to potentially damage the tip 568, or to prevent the defect from affecting a moveable nanoelement being manipulated by the probe 562. Each forbidden region may be bounded by a circular boundary, elliptical boundary, rectangular boundary, polygonal boundary, closed geometry shape, or by another geometric boundary as determined by the shape of an associated defect. For example, the boundary of a forbidden region may be determined as at a distance of five nanometers away from the defect at a normal vector from a nearest side of the defect. In another example, a defect may be determined to have an average radius of six nanometers, and the boundary of the associated forbidden region may be determined to be a circular region having a radius three nanometers longer than the average radius of the defect. While specific examples have been provided, any geometric shapes and sizes of boundaries may be applied to prevent damage to the tip 568 of the STM probe 562, or to prevent fabrication error during atomic manipulation of movable nanoelements.

In examples, the processor 522 may further determine additional forbidden regions having one or more moveable nanoelements disposed therein. For example, it may be determined that one nanoelement needs to be moved to an opposite side of another nanoelement, and therefore, a forbidden region may be determined to be around each movable nanoelement to prevent the probe 562 of the STM 555 from causing collisions of moveable nanoelements, or fabrication errors, during a fabrication cycle.

The method 600 further includes accessing, by the processor 522, an atomic structure design 542 (block 614). The atomic structure design 542 is a design of a desired atomic structure for fabricating the desired atomic structure on the atomic manipulation surface 572. The atomic structure design 542 may include desired design positions of a plurality of atoms, molecules, or other movable nanoelements, for example, such as the desired design positions illustrated in FIGS. 3A-3D and 4A-4D. The atomic structure design 542 may be a text document with code indicating relative positons on the surface as the desired design positions. The atomic structure design 542 may be a graphic file that illustrates the desired design positions in an image. In examples, the atomic structure design 542 may be a text file having x and y image coordinates identifying the desired design positions on the surface.

According to the atomic structure design 542, the processor 522 determines the design plan 545 for fabricating the atomic structure on the surface 572. The processor 522 determines the design plan 545 from the positions of the movable atoms and the one or more forbidden regions. As described with reference to FIGS. 4A-4D, the design plan 545 includes a plurality of vectors indicative of movements paths. Each movement path is a path for moving a single movable nanoelement from its position on the surface 572, to a desired design position. Additionally, each movement path does not traverse or pass through any of the forbidden regions. A movement path may include a single movement vector, or may be composed of multiple movement vectors to avoid other movable nanoelements and/or forbidden regions. The processor 522 determines the design plan 545 to only include movement paths that manipulate atoms into desired design positions, and the movement paths avoid traversing any forbidden region of the surface 572.

The method 600 then includes performing, by the STM 555, an atomic structure fabrication cycle according to the design plan 545 (block 618). To perform the fabrication cycle, the processor 522 provides the design plan 545 to the controller 550 and the controller 550 controls the STM 555 to perform the fabrication cycle according to the design plan 545. Therefore, the STM 555 fabricates the nanostructure without the probe 562 of the STM 555 ever traversing any forbidden region, allowing for automatic fabrication of the nanostructure without risk of damaging the probe of the STM 555.

To determine the design plan 545, the processor 522 may perform a global path optimization to generate the design plan 545 having a minimum overall movement path length. The overall path length for a design plan 545 is a sum of the distances of all of the movement path lengths of the design plan 545. The processor 522 may determine a plurality of design plans and compare corresponding overall path lengths of each design plan to determine a design plan having the minimum overall path length. For example, the minimum overall path length may be determined as the minimum sum of all total path lengths for moving moveable nanoelements to desired design positions while avoiding forbidden regions. Performing a global path optimization may further reduce fabrication times, and also reduce the potential for errors due to reduced overall movement of the probe during an STM fabrication cycle.

Figure 7:
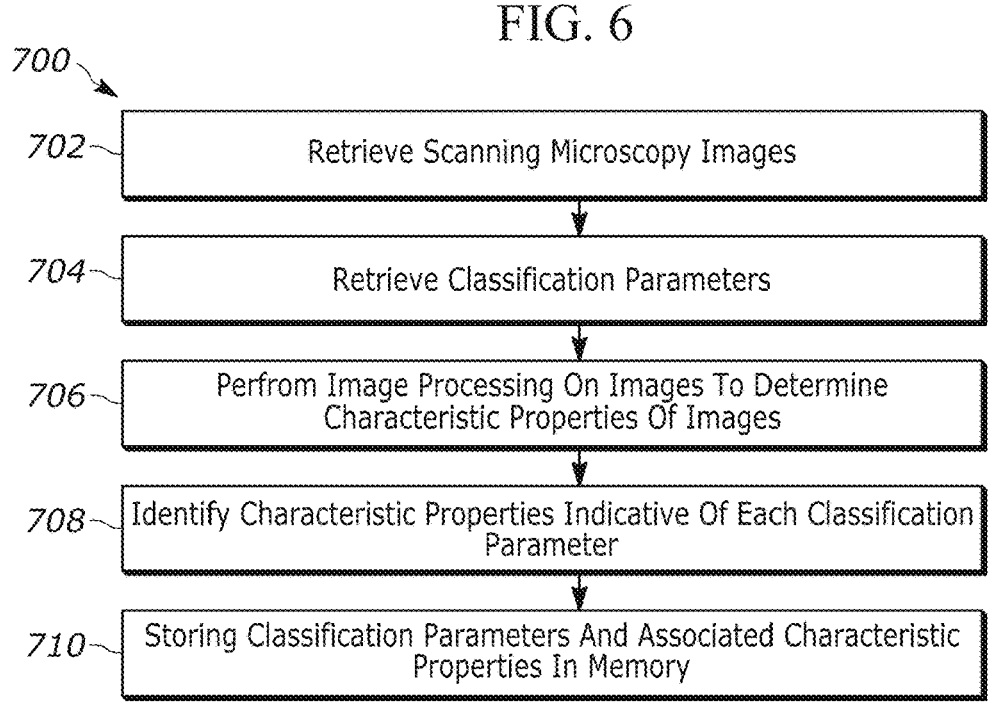
FIG. 7 is a flow diagram of a method of performing a machine vision technique for training a system for performing automated atomic scale manipulation.

FIG. 7 is a flow diagram of a method 700 of performing a machine vision technique for training a system for performing automated atomic scale manipulation. The method 700 may be performed by the system 520 of FIG. 5. The processor 522 retrieves a plurality of scanning microscopy images 550 from the memory 525 (block 702). The processor 522 further retrieves classification parameters 552 from the memory 525, with each classification parameter 552 being associated with a respective image of the plurality of images 550 (block 704). The classification parameters 552 include a classification of whether the associated image (i) contains a moveable nanoelement, (ii) contains a defect, or (iii) is of an empty region of a surface. The classification parameters 552 may be numbers, for example, a classification of 1 may indicate the image contains a moveable nanoelement, a classification of 2 indicative an image having a defect, and so on. The classification parameters may be words, strings, alphanumerics, binary values, or other types of data or structures to indicate the presence, or lack thereof, of a moveable nanoelement, and/or a defect.

The processor 522 performs image processing 528 on the retrieved images and determines characteristic properties of the images (block 706). As described with reference to the method 600 of FIG. 6, the characteristic properties may include one or more sharpness values, contrast values, average pixel intensities, modulation transfer function value, or feature geometries that are indicative of the classification parameters 552 associated with each of the images 550. For example, images having defects may typically have contrast values above a given limit, while images containing movable nanoelements typically have contrast values below the given limit. The method 700 may include generating a feature importance map that identifies features such as sizes or geometric shapes as the characteristic properties.

The processor 522 then identifies the characteristic image properties that are indicative of each of the classification properties 552 (block 708). For example, the processor 522 may take the average pixel intensity value across all of the images 550 having a classification parameter 552 indicative of the presence of a movable nanoelement. The processor 522 then associates the determined average contrast value with the classification parameter 552 for images having a movable nanoelement.

The processor 522 stores the classification properties 552, and associated characteristic image properties as the moveable nanoelement characteristic properties 537 and the defect characteristic properties 539, in the memory 525 (block 710). The classification properties 552, moveable nanoelement characteristic properties 537, and defect characteristic properties 539 may then be retrieved for use in determining the presence of movable nanostructures and/or defects from images obtained during an STM scan, as described in reference to the method 600 of FIG. 6. The processor 522 may provide the classification parameters 552, and associated characteristic image properties directly to the STM system 555 to perform an automated nanostructure fabrication cycle.

FIGS. 8A-8C are STM images of a surface 800 illustrating nanostructure fabrication according to the automated nanoscale manipulation methods described herein. FIG. 8A is an image of the surface 800 taken by an STM system with a plurality of moveable nanoelements 811 in the form of carbon-monoxide (CO) molecules, positioned at initial positions 813 on the surface 800. The image also shows defects 812 in various regions of the surface 800, and desired design positions 820.

The method 600 of FIG. 6 was performed on the image presented in FIG. 8A. A processor identified the moveable nanoelements 811, and the defects 812, and respective positions of the movable nanoelements 813, and defects 812. The processor then determined the forbidden regions not to be traversed by a probe during the nanostructure fabrication design cycle. FIG. 8B illustrates the determined forbidden regions 815 of the surface 800. The processor determined forbidden regions that contain both each of the defects 812, and each of the movable nanoelements 811. The forbidden regions 815 of FIG. 8B were determined to be circular regions having a radius that is twice as long as the longest radial distance of the defect. In examples, the forbidden region may be determined to be 25% larger, 50% larger, 75% larger, or another increased percentage or multiple of a radius of a defect. Further, the size of the forbidden region may be determined by a measured pixel distance of the defect or moveable nanoelement. The processor may determine the shape and size of the defect or moveable nanoelement by determining the geometry of the defect or movable nanoelement as previously described when identifying the defect or moveable nanoelement from candidate features of the image.

FIG. 8C shows a determined design plan with movement paths 830 and 832 for performing a design fabrication cycle as determined by the processor. It should be noted that some of the moveable nanoelements 811 have been assigned a single vector movement path 830 to move the movable nanoelement 811 to a respective desired design position 820, and some of the movable nanoelements 811 have been assigned a double vector movement path 832 to avoid defects 815 and/or other movable nanoelements 811 during the fabrication cycle.

The following list of aspects reflects a variety of the embodiments explicitly contemplated by the present disclosure. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A method for performing automated atomic manipulation, the method comprising: obtaining, by an imaging sensor, a surface image of an atomic manipulation surface; determining, by a processor and from the surface image, a plurality of candidate features of the atomic manipulation surface, each candidate feature being one of a movable atom or a defect, and each candidate feature being in a respective region of the image of the surface; identifying, by the processor, which of the plurality of candidate features are movable atoms or molecules; identifying, by the processor, respective positions of each of the movable atoms; identifying, by the processor, which of the plurality of candidate features are defects; identifying, by the processor, one or more forbidden regions, wherein each of the one or more forbidden regions contains an identified defect, and wherein each forbidden region is indicative of a region of the surface that is not to be traversed by a probe tip of a scanning probe microscope.

2. The method of aspect 1, wherein identifying which of the candidate features are movable atoms comprises implementing a machine learning technique.

3. The method of aspect 1, wherein identifying which of the candidate features are movable atoms comprises: retrieving, by the processor and from a memory, characteristic properties of images of surfaces having movable atoms thereon; performing, by the processor, image processing on the surface image and determining characteristic properties of regions of the surface image; and comparing, by the processor, the characteristic properties of the regions of the surface with characteristic properties of images of surfaces having movable atoms thereon.

4. The method of aspect 3, wherein determining characteristic properties of regions of the surface image comprises determining at least one of an image sharpness, a contrast value, an edge detection value, or a geometry of a candidate feature in the surface image.

5. The method of any of aspects 1 to 5, wherein identifying which of the candidate features are defects comprises implementing a machine learning technique.

6. The method of any of aspects 1 to 5, wherein identifying which of the candidate features are defects comprises: retrieving, by the processor and from a memory, characteristic properties of images of surfaces having defects; performing, by the processor, image processing on the surface image and determining characteristic properties of regions of the surface image; and comparing, by the processor, the characteristic properties of the regions of the surface with characteristic properties of images of surfaces having defects.

7. The method of aspect 6, wherein determining characteristic properties of regions of the surface image comprises determining at least one of an image sharpness, a contrast value, an edge detection value, or a geometry of a candidate feature in the surface image.

8. The method of any of aspects 1 to 7, wherein each forbidden region is bounded by one of a polygonal geometric boundary, a circular geometric boundary, or an elliptical geometric boundary.

9. The method of any of aspects 1 to 7, wherein each forbidden region is bounded by a boundary determined from the size and shape of a respective defect contained in the respective forbidden region.

10. The method of any of aspects 1 to 9, further comprising: accessing, by the processor, an atomic structure design indicative of a desired atomic structure on the surface; determining, by the processor, a design plan for fabricating the atomic structure on the surface, the design plan determined from (i) the positions of the movable atoms and (ii) the one or more forbidden regions; and performing, by a scanning microscope, the design plan and fabricating the atomic structure, wherein the design plan prevents a probe tip of the scanning microscope from traversing any forbidden region.

11. The method of aspect 10, wherein determining the design plan further includes performing a global path minimization for moving the movable atoms from their identified positions, to respective positions required for fabricating the atomic structure.

12. A method of training a system for performing automated atomic scale manipulation, the method comprising: retrieving, by a processor and from a memory, a plurality of scanning microscopy images, each image including a classification parameter identifying each image as including either (i) a movable atom, or (ii) a defect; performing, by the processor, image processing on the images and determining, through the image processing, characteristic properties of the images; and identifying, by the processor and from the characteristic properties of the images, identification properties for each classification parameter, the identification properties being indicative of images belonging to each respective classification parameter.

13. The method of aspect 12, wherein the characteristics properties includes one or more of an image sharpness, a contrast value, an edge detection value, or a geometry of a candidate feature in the surface image.

14. The method of either of aspect 12 or 13, further comprising, providing the identified associated characteristic properties and classification parameters to a scanning microscope system.

15. The method of any of aspects 12 to 14, further comprising, storing the identified associated characteristic parameters and classification parameters in a memory.

16. A system for performing atomic scale manipulation, the system comprising: a scanning microscope, the scanning microscope having a scanning probe that provides electrostatic manipulation of positions of atoms on a surface; a processor configured to execute machine readable instructions; and a non-transitory computer-readable memory having machine readable instructions stored thereon, that when executed by the processor, cause the system to: obtain, by the scanning microscope, a surface image of a surface having movable nanostructures and defects; identify, by the processor, a plurality of movable nanostructures and positions of each movable nanostructure on the surface; identify, by the processor, a plurality of defects and a position of each defect on the surface; identify, by the processor and from the plurality of defects, a plurality of forbidden regions, each forbidden region containing an identified defect, and wherein each forbidden region is indicative of a region of the surface that is not to be traversed by the scanning probe of the scanning microscope.

17. The system of aspect 16, wherein to identify a plurality of movable nanostructures, the machine readable instructions further cause the system to implement a machine learning technique.

18. The system of claim 16, wherein to identify a plurality of movable nanostructures, the machine readable instructions further cause the system to: retrieve, by the processor and from a memory, characteristic properties of images of surfaces having movable atoms thereon; perform, by the processor, image processing on the surface image and determining characteristic properties of regions of the surface image; and compare, by the processor, the characteristic properties of the regions of the surface with characteristic properties of images of surfaces having movable atoms thereon.

19. The system of aspect 18, wherein to determine characteristic properties of regions of the surface image the machine readable instructions further cause the system to determine at least one of an image sharpness, a contrast value, an edge detection value, or a geometry of a candidate feature in the surface image.

20. The system of any of aspects 16 to 19, wherein to identify a plurality of defects, the machine readable instructions further cause the system to implement a machine learning technique.

21. The system of any of aspects 16 to 19, wherein to identify a plurality of defects, the machine readable instructions further cause the system to: retrieve, by the processor and from a memory, characteristic properties of images of surfaces having defects; perform, by the processor, image processing on the surface image and determining characteristic properties of regions of the surface image; and compare, by the processor, the characteristic properties of the regions of the surface with characteristic properties of images of surfaces having defects.

22. The system of aspect 21, wherein to determine characteristic properties of regions of the surface image the machine readable instructions further cause the system to determine, by the processor at least one of an image sharpness, a contrast value, an edge detection value, or a geometry of a candidate feature in the surface image.

23. The system of any of aspects 16 to 22, wherein each forbidden region is bounded by one of a polygonal geometric boundary, a circular geometric boundary, or an elliptical geometric boundary.

24. The system of any of aspects 16 to 22, wherein each forbidden region is bounded by a boundary determined from the size and shape of a respective defect contained in the respective forbidden region.

25. The system of any of aspects 16 to 24, wherein the machine readable instructions further cause the system to: access, by the processor, an atomic structure design indicative of a desired atomic structure on the surface; determine, by the processor, a design plan for fabricating the atomic structure on the surface, the design plan determined from (i) the positions of the movable atoms and (ii) the one or more forbidden regions; and perform, by a scanning microscope, the design plan and fabricating the atomic structure, wherein the design plan prevents a probe tip of the scanning microscope from traversing any forbidden region.

26. The system of aspect 25, wherein to determine the design plan, the machine readable instructions further cause the system to perform a global path minimization for moving the movable nanostructures from their identified positions, to respective positions required for fabricating the atomic structure.

What is claimed is:

1. A method for performing automated atomic manipulation, the method comprising:
    obtaining, by an imaging sensor, a surface image of an atomic manipulation surface;
    determining, by a processor and from the surface image, a plurality of candidate features of the atomic manipulation surface, each candidate feature being one of a movable atom or a defect, and each candidate feature being in a respective region of the image of the surface;
    identifying, by the processor, which of the plurality of candidate features are movable nanoelements;
    identifying, by the processor, respective positions of each of the movable nanoelements;
    identifying, by the processor, which of the plurality of candidate features are defects;
    identifying, by the processor, one or more forbidden regions, wherein each of the one or more forbidden regions contains an identified defect, and wherein each forbidden region is indicative of a region of the surface that is not to be traversed by a probe tip of a scanning probe microscope.

2. The method of claim 1, wherein identifying which of the candidate features are movable nanoelements comprises implementing a machine learning technique.

3. The method of claim 1, wherein identifying which of the candidate features are movable atoms comprises:
    retrieving, by the processor and from a memory, characteristic properties of images of surfaces having movable nanoelements thereon;
    performing, by the processor, image processing on the surface image and determining characteristic properties of regions of the surface image; and
    comparing, by the processor, the characteristic properties of the regions of the surface with characteristic properties of images of surfaces having movable nanoelements thereon.

4. The method of claim 3, wherein determining characteristic properties of regions of the surface image comprises determining at least one of an image sharpness, a contrast value, an edge detection value, or a geometry of a candidate feature in the surface image.

5. The method of claim 1, wherein identifying which of the candidate features are defects comprises implementing a machine learning technique.

6. The method of claim 1, wherein identifying which of the candidate features are defects comprises:
    retrieving, by the processor and from a memory, characteristic properties of images of surfaces having defects;
    performing, by the processor, image processing on the surface image and determining characteristic properties of regions of the surface image; and
    comparing, by the processor, the characteristic properties of the regions of the surface with characteristic properties of images of surfaces having defects.

7. The method of claim 6, wherein determining characteristic properties of regions of the surface image comprises determining at least one of an image sharpness, a contrast value, an edge detection value, or a geometry of a candidate feature in the surface image.

8. The method of claim 1, wherein each forbidden region is bounded by one of a polygonal geometric boundary, a circular geometric boundary, or an elliptical geometric boundary.

9. The method of claim 1, wherein each forbidden region is bounded by a boundary determined from the size and shape of a respective defect contained in the respective forbidden region.

10. The method of claim 1, further comprising:
    accessing, by the processor, an atomic structure design indicative of a desired atomic structure on the surface;
    determining, by the processor, a design plan for fabricating the atomic structure on the surface, the design plan determined from (i) the positions of the movable nanoelements and (ii) the one or more forbidden regions; and
    performing, by a scanning microscope, the design plan and fabricating the atomic structure, wherein the design plan prevents a probe tip of the scanning microscope from traversing any forbidden region.

11. The method of claim 10, wherein determining the design plan further includes performing a global path minimization for moving the movable nanoelements from their identified positions, to respective positions required for fabricating the atomic structure.

12. A system for performing atomic scale manipulation, the system comprising:

a scanning microscope, the scanning microscope having a scanning probe that provides electrostatic manipulation of positions of atoms on a surface;

a processor configured to execute machine readable instructions; and a non-transitory computer-readable memory having machine readable instructions stored thereon, that when executed by the processor, cause the system to:

obtain, by the scanning microscope, a surface image of a surface having movable naoelements and defects;

identify, by the processor, a plurality of movable nanoelements and positions of each movable nanoelement on the surface;

identify, by the processor, a plurality of defects and a position of each defect on the surface;

identify, by the processor and from the plurality of defects, a plurality of forbidden regions, each forbidden region containing an identified defect, and wherein each forbidden region is indicative of a region of the surface that is not to be traversed by the scanning probe of the scanning microscope.

13. The system of claim 12, wherein to identify a plurality of movable nanostructures, the machine readable instructions further cause the system to implement a machine learning technique.

14. The system of claim 12, wherein to identify a plurality of movable nanostructures, the machine readable instructions further cause the system to:

retrieve, by the processor and from a memory, characteristic properties of images of surfaces having movable atoms thereon;

perform, by the processor, image processing on the surface image and determining characteristic properties of regions of the surface image; and compare, by the processor, the characteristic properties of the regions of the surface with characteristic properties of images of surfaces having movable atoms thereon.

15. The system of claim 12, wherein to identify a plurality of defects, the machine readable instructions further cause the system to implement a machine learning technique.

16. The system of claim 12, wherein to identify a plurality of defects, the machine readable instructions further cause the system to:

retrieve, by the processor and from a memory, characteristic properties of images of surfaces having defects;

perform, by the processor, image processing on the surface image and determine characteristic properties of regions of the surface image; and compare, by the processor, the characteristic properties of the regions of the surface with characteristic properties of images of surfaces having defects.

* * * * *

UNITED STATES PATENT AND TRADEMARK OFFICE
CERTIFICATE OF CORRECTION

Page 1 of 1

PATENT NO. : 12,387,313 B2
APPLICATION NO. : 17/733812
DATED : August 12, 2025
INVENTOR(S) : Daniel Joseph Trainer et al.

It is certified that error appears in the above-identified patent and that said Letters Patent is hereby corrected as shown below:

In the Claims

At Column 19, Line 11, "naoelements" should be -- nanoelements --.

Signed and Sealed this
Second Day of December, 2025

John A. Squires
*Director of the United States Patent and Trademark Office*